(12) United States Patent
Vijendra

(10) Patent No.: US 7,792,045 B1
(45) Date of Patent: Sep. 7, 2010

(54) METHOD AND APPARATUS FOR CONFIGURATION AND ANALYSIS OF INTERNAL NETWORK ROUTING PROTOCOLS

(75) Inventor: Sudhir Vijendra, White Plains, NY (US)

(73) Assignee: EMC Corporation, Hopkinton, MA (US)

( * ) Notice: Subject to any disclaimer, the term of this patent is extended or adjusted under 35 U.S.C. 154(b) by 1095 days.

(21) Appl. No.: 11/395,456

(22) Filed: Mar. 31, 2006

Related U.S. Application Data

(63) Continuation-in-part of application No. 11/211,234, filed on Aug. 25, 2005.

(51) Int. Cl.
*H04J 1/16* (2006.01)
(52) U.S. Cl. .................. 370/244; 370/216; 370/217; 370/242; 370/250
(58) Field of Classification Search ................ 370/252, 370/254, 216, 217, 242, 250, 244
See application file for complete search history.

(56) References Cited

U.S. PATENT DOCUMENTS

| | | | |
|---|---|---|---|
| 5,661,668 A * | 8/1997 | Yemini et al. ............... 702/186 |
| 6,249,755 B1 * | 6/2001 | Yemini et al. ............... 702/183 |
| 6,253,339 B1 * | 6/2001 | Tse et al. ...................... 714/47 |
| 6,707,795 B1 * | 3/2004 | Noorhosseini et al. ...... 370/242 |
| 6,820,134 B1 * | 11/2004 | Zinin et al. .................. 709/238 |
| 7,043,661 B2 * | 5/2006 | Valadarsky et al. ............ 714/4 |
| 7,275,250 B1 * | 9/2007 | Novik et al. ................. 719/318 |
| 7,552,747 B1 * | 6/2009 | Sargsyan ..................... 137/801 |
| 7,668,953 B1 * | 2/2010 | Sinclair et al. .............. 709/224 |
| 2002/0152185 A1 * | 10/2002 | Satish Jamadagni ........... 706/1 |
| 2003/0137974 A1 * | 7/2003 | Kwan et al. ................. 370/352 |
| 2004/0258002 A1 * | 12/2004 | Tran et al. .................... 370/254 |
| 2005/0071130 A1 * | 3/2005 | Benjamin et al. ........... 702/188 |
| 2006/0209719 A1 * | 9/2006 | Previdi et al. ............... 370/254 |
| 2006/0291391 A1 * | 12/2006 | Vasseur et al. .............. 370/235 |

* cited by examiner

*Primary Examiner*—Ricky Ngo
*Assistant Examiner*—Dewanda Samuel
(74) *Attorney, Agent, or Firm*—Krishnendu Gupta; Joseph D'Angelo

(57) ABSTRACT

A method and apparatus for operating on a system containing a plurality of components in communication using at least one communication protocol is disclosed. The method comprises the steps of representing selected ones of the plurality of components, the relationship among the components and the associated communication protocols, determining a mapping between a plurality of events and a plurality of observable events occurring among the components and among the communication protocols, wherein the mapping is represented as a value associating each event with each observable event, and performing the operation in conjunction with the events and observable events, wherein events associated with the communication protocols are distinguished from events associated with the components. The operations may be selected from the group of monitoring, discovering, managing, analyzing and displaying the components associated with the multicast protocols.

13 Claims, 14 Drawing Sheets

| RELATIONSHIP/ CONNECTION PAIRS | EXAMPLES |
|---|---|
| AccessedVia/ Accesses | EIGRPService - *AccessedVia* → EIGRPProtocolEndpoint<br>EIGRPProtocolEndpoint - *Accesses* → EIGRPService<br>ISISService - *AccessedVia* → ISISNeighborEndpoint<br>ISISNeighborEndpoint - *Accesses* → ISISService |
| ComposedOf/ PartOf | Router - *ComposedTo* → Interface<br>Interface - *PartOf* → Router |
| ConnectedTo/ ConnectedVia | EIGRPSession - *ConnectedTo* → EIGRPService<br>EIGRPService - *ConnectedVia* → EIGRPSession<br>ISISNetwork - *ConnectedTo* → ISISInterface<br>ISISInterface - *ConnectedVia* → ISISNetwork |
| ConnectedSystems* | EIGRPProcess - *ConnectedSystems* → Router<br>ISISArea - *ConnectedSystems* → Router |
| ConsistsOf/ MemberOf | EIGRPProcess - *ConsistsOf* → EIGRPNetwork<br>EIGRPNetwork - *MemberOf* → EIGRPProcess<br>ISISArea - *ConsistsOf* → ISISNetwork<br>ISISNetwork - *MemberOf* → ISISArea |
| HostedBy/ HostsServices | EIGRPService - *HostedBy* → Router<br>Router - *HostsServices* → EIGRPService<br>ISISService - *HostedBy* → Router<br>Router - *HostsServices* → ISISService |
| LayeredOver/ Underlying | EIGRPProtocolEndpoint - *LayeredOver* → Interface<br>Interface - *Underlying* → EIGRPProtocolEndpoint<br>ISISNeighborEndpoint - *LayeredOver* → ISISInterface<br>ISISInterface - *Underlying* → ISISNeighborEndpoint |
| *ConnectedSystems has no inverse relationship. | |

FIG. 4C

| SYMPTOM | DESCRIPTION | CATEGORY | SEVERITY | DETAILS |
|---|---|---|---|---|
| DISCONNECT | THE EIGRP SESSION IS NOT ESTABLISHED. THIS SYMPTOM IS REPORTED AS A SYMPTOMATIC EVENT NOTIFICATION TO SAM. | OPERATION | 2 | ESTABLISHED |

*EIGRPSession Symptoms

FIG. 5A

| PROBLEM | DESCRIPTION | CATEGORY | SEVERITY | DETAILS |
|---|---|---|---|---|
| DOWN | THE EIGRP SESSION IS NOT ESTABLISHED, AND NO OTHER KNOWN ROOT CAUSE CAN EXPLAIN WHY THE SESSION IS NOT ESTABLISHED. SYMPTOM:<br>* DISCONNECT | OPERATION | 1 | ESTABLISHED |

*EIGRPSession Problems

FIG. 5B

| PROBLEM | DESCRIPTION | CATEGORY | SEVERITY | DETAILS |
|---|---|---|---|---|
| DOWN | THIS EIGRP SERVICE IS DOWN, AND ALL THE EIGRP SESSIONS ASSOCIATED WITH THIS SERVICE ARE DOWN. | OPERATION | 1 | |

*EIGRPService Problems

FIG. 5C

| SYMPTOM | DESCRIPTION | CATEGORY | SEVERITY | DETAILS |
|---|---|---|---|---|
| AdministrativelyDown | THIS EIGRP PROTOCOL ENDPOINT OR ITS ASSOCIATED PHYSICAL INTERFACE IS ADMINISTRATIVELY DOWN (MANUALLY DISABLED). | ADMINISTRATION | 1 | |
| RemoteSpeakerNotConfiguredEvent | THE EIGRP PEER FOR THIS ENDPOINT IS NOT CONFIGURED TO SPEAK EIGRP TO THIS ENDPOINT. | CONFIGURATION | 1 | |
| RemoteSystemNotRunningEIGRPEvent | THE EIGRP PEER FOR THIS ENDPOINT DOES NOT RUN EIGRP. | CONFIGURATION | 1 | |

*EIGRPProtocolEndpoint Symptoms

FIG. 5D

| PROBLEM | DESCRIPTION | CATEGORY | SEVERITY | DETAILS |
|---|---|---|---|---|
| Disabled | THIS EIGRP PROTOCOL ENDPOINT OR ITS ASSOCIATED PHYSICAL INTERFACE IS ADMINISTRATIVELY DOWN (MANUALLY DISABLED), AND THE EIGRP SESSION ON THIS ENDPOINT IS REPORTING AN IMPROPER STATE. SYMPTOMS: <br> * DISCONNECT <br> * AdministrativelyDown | ADMINI-STRATION | 2 | Peer-System Remote-Address |
| Remote-SpeakerNot-Configured | THE EIGRP PEER FOR THIS ENDPOINT IS NOT CONFIGURED TO SPEAK EIGRP TO THIS ENDPOINT, AND THE EIGRP SESSION ON THIS ENDPOINT IS REPORTING AN IMPROPER STATE. SYMPTOMS: <br> * DISCONNECT <br> * RemoteSpeakerNotConfiguredEvent | CONFIGU-RATION | 1 | |
| Remote-SystemNot-Running-EIGRP | THE EIGRP PEER FOR THIS ENDPOINT DOES NOT RUN EIGRP, AND THE EIGRP SESSION ON THIS ENDPOINT IS REPORTING AN IMPROPER STATE. SYMPTOMS: <br> * DISCONNECT <br> * RemoteSystemNotRunningEIGRPEvent | CONFIGU-RATION | 1 | |

*EIGRPProtocolEndpoint Problems

FIG. 5E

| SYMPTOM | DESCRIPTION | CATEGORY | SEVERITY | DETAILS |
|---|---|---|---|---|
| ISISInterface-Failure-Symptom | THE ROUTING DEVICE ON WHICH THIS IS-IS SERVICE IS RUNNING HAS AN IS-IS INTERFACE FAILURE. | OPERATION | 3 | REVIEWER: ANY DETAILS HERE? |

ISISService Symptoms

FIG. 6A

| SYMPTOM | DESCRIPTION | CATEGORY | SEVERITY | DETAILS |
|---|---|---|---|---|
| Neighbor-StateAlarm | ONE OF THE TWO NEIGHBORS FOR THIS IS-IS LINK IS REPORTING AN IMPROPER NEIGHBOR STATE. THIS SYMPTOM IS REPORTED AS A SYMPTOMATIC EVENT NOTIFICATION TO SAM. | OPERATION | 3 | |

ISISAdjacency Symptoms

FIG. 6B

| PROBLEM | DESCRIPTION | CATEGORY | SEVERITY | DETAILS |
|---|---|---|---|---|
| DOWN | THE IS-IS LINK BETWEEN NEIGHBORING ENDPOINTS IS DOWN.<br>SYMPTOM:<br>* NeighborStateAlarm | OPERATION | 1 | NeighborStateImproper<br>Endpoint1DisplayName<br>ifType1<br>isEndpoint1Passive<br>NeighborState1<br>Endpoint2DisplayName<br>ifType2<br>isEndpoint2Passive<br>NeighborState2 |

ISISAdjacency Problems

FIG. 6C

| SYMPTOM | DESCRIPTION | CATEGORY | SEVERITY | DETAILS |
|---|---|---|---|---|
| Unknown-NbmaNeighborSymptom | AN NBMA NEIGHBOR MISCONFIGURATION EXITS ON THIS IS-IS NEIGHBOR ENDPOINT. | CONFIGU-RATION | 1 | |

ISISNeighborEndpoint Symptoms

| PROBLEM | DESCRIPTION | CATEGORY | SEVERITY | DETAILS |
|---|---|---|---|---|
| Unknown-NbmaNeighbor | THE NBMA NEIGHBOR FOR THIS IS-IS NEIGHBOR ENDPOINTS NOT PRESENT IN THE TOPOLOGY. SYMPTOMS:<br>* NeighborStateAlarm<br>* UnknownNbmaNeighborSymptom | CONFIGU-RATION | 1 | |

ISISNeighborEndpoint Problems

FIG. 6D

| SYMPTOM | DESCRIPTION | CATEGORY | SEVERITY | DETAILS |
|---|---|---|---|---|
| ArealDMismatch-Symptom, AuthKeyMismatch-Symptom, AuthTypeMismatch-Symptom, DuplicateSystemID-Symptom, HellointervalMismatchSymptom | MISCONFIGURATION SYMPTOMS EXITS ON THIS IS-IS INTERFACE. THESE SYMPTOMS ARE PROPAGATED FROM IS-IS ADJACENCIES. | CONFIGURATION | 1 | REVIEWER: ARE THESE DETAILS CORRECT? ArealD OneNeighborArealD AuthType OneNeighborAuthType Hellointerval OneNeighborHellointerval |

ISISInterface Events

FIG. 6E

| SYMPTOM | DESCRIPTION | CATEGORY | SEVERITY | DETAILS |
|---|---|---|---|---|
| Disabled-Admin-Symptom | THIS IS-IS INTERFACE OR ITS ASSOCIATED PHYSICAL INTERFACE IS ADMINISTRATIVELY DOWN (MANUALLY DISABLED), AND IS-IS ADJACECIES EXIST ON THIS INTERFACE. | ADMINISTRATION | 1 | |
| MTU-Mismatch-Symptom | AN MTU MISCONFIGURATION EXISTS ON THIS IS-IS INTERFACE, PROPAGATED FROM IS-IS ADJACECIES. | ADMINISTRATION | 1 | |
| Netmask-Mismatch-Symptom | A NETMASK MISCONFIGURATION EXISTS ON THIS IS-IS INTERFACE, PROPAGATED FROM IS-IS ADJACECIES. | ADMINISTRATION | 1 | |
| ISISEndpoint-Failure-Symptom | THE NEIGHBORING ENDPOINTS CONNECTED TO THIS IS-IS INTERFACE IS REPORTING A FAILURE. | OPERATION | 3 | |
| ISISLink-Failure-Symptom | THE IS-IS LINK CONNECTED TO THIS IS-IS INTERFACE IS REPORTING A FAILURE. | OPERATION | 3 | |
| Neighbor-StateAlarm | THE NEIGHBOR FOR THIS IS-IS INTERFACE IS REPORTING AN IMPROPER NEIGHBOR STATE. | OPERATION | 3 | |

ISISInterface Symptoms

FIG. 6F

| PROBLEM | DESCRIPTION | CATEGORY | SEVERITY | DETAILS |
|---|---|---|---|---|
| DISABLED | THIS IS-IS INTERFACE OR ITS ASSOCIATED PHYSICAL INTERFACE IS ADMINISTRATIVELY DOWN (MANUALLY DISABLED), AND AT LEAST ONE IS-IS ADJACENCY ON THIS INTERFACE IS REPORTING AN IMPROPER STATE.<br>SYMPTOMS:<br>* NeighborStateAlarm<br>* DisabledAdminSymptom | ADMINI-STRATION | 2 | REVIEWER: ARE THESE DETAILS CORRECT?<br>AdminStatus<br>AreaID<br>AreaType<br>IfState<br>IfType |

ISISInterface Problems

FIG. 6G

| EVENT | DESCRIPTION | CATEGORY | SEVERITY | DETAILS |
|---|---|---|---|---|
| AllRouter-Priorities-Zero | NO ROUTING DEVICE ON THIS BROADCAST OR NBMA NETWORK HAS A PRIORITY GREATER THAN 0.<br>THIS EVENT IS REPORTED AS A SYMPTOMATIC EVENT NOTIFICATION TO SAM. | CONFIGU-RATION | 1 | |

ISISNetwork Events

FIG. 6H

| PROBLEM | DESCRIPTION | CATEGORY | SEVERITY | DETAILS |
|---|---|---|---|---|
| AreaIDMismatch,<br>AuthKeyMismatch,<br>AuthTypeMismatch,<br>DuplicateSystemID,<br>HelloIntervalMismatch,<br>MTUMismatch,<br>NtmaskMismatch | MISCONFIGURATION EVENTS EXIST ON THIS IS-IS NETWORK.<br>SYMPTOMS:<br>* NeighborStateAlarm<br>* MISCONFIGURATION SYMPTOMS FOR IS-IS INTERFACE. | CONFIGU-RATION | 1 | |

ISISNetwork Problems

FIG. 6I

METHOD AND APPARATUS FOR CONFIGURATION AND ANALYSIS OF INTERNAL NETWORK ROUTING PROTOCOLS

CLAIM OF PRIORITY

The instant application is a continuation-in-part and claims the benefit of the earlier filing date of that patent application entitled "Method and Apparatus for Configuration and Analysis of Network Routing Protocols" filed in the US Patent Office on Aug. 25, 2005 and afforded Ser. No. 11/211,234, the contents of which are incorporated by reference herein.

RELATED APPLICATION

The instant application is related to commonly owned:
U.S. patent application Ser. No. 11/211,250, entitled "Method and Apparatus for Configuration and Analysis of Network Multicast Routing Protocols," concurrently filed on Aug. 25, 2005 and U.S. patent application Ser. No. 11/263,689, entitled "Method and Apparatus for Event Correlation and Problem Reporting," filed on Nov. 1, 2005; U.S. patent application Ser. No. 11/034,192, entitled "Method and Apparatus for Event Correlation and Problem Reporting," filed on Jan. 12, 2005, now U.S. Pat. No. 7,003,433; U.S. patent application Ser. No. 10/400,718, entitled "Method and Apparatus for Event Correlation and Problem Reporting," now U.S. Pat. No. 6,868,367, filed on Mar. 23, 2003; U.S. patent application Ser. No. 08/893,263, entitled "Apparatus and Method for Event Correlation and Problem Reporting," now U.S. Pat. No. 6,249,755, filed on Jul. 15, 1997; U.S. patent application Ser. No. 08/679,443, entitled "Apparatus and Method for Analyzing and Correlating Events in a System Using a Causality Matrix," now U.S. Pat. No. 5,661,668, filed on Jul. 12, 1996; and U.S. patent application Ser. No. 08/249,282; entitled "Apparatus and Method for Event Correlation and Problem Reporting," now U.S. Pat. No. 5,528,516, filed on May 25, 1994, the contents of all of which are incorporated by reference herein.

FIELD OF THE INVENTION

The present invention is related to the field of distributed systems, and more particularly, to the discovery, identification and management of external network protocol configurations and operations.

BACKGROUND

Networks, from telephone to the Internet, have continued to expand as businesses have embraced their use in communicating internally among their employees or externally with, or to provide services to, consumers or users. Network technologies, in response, have continued to expand to make network operation more efficient and to allow different networks the means to communicate with and pass information between one another. In one aspect of network technology development, the International Organization for Standardization have developed the Open Source Interface (OSI) architectural model that provides a standardize means for communicating within a network entity or communicating between network entities. The OSI stack is divided into seven layers, which are well-known and comprise a physical layer representing the physical (hardware) and electrical signal implementation, (Layer 1), a data link layer representing the formats used for transmitting data over the network (Layer 2) and a network layer representing the address assignments and packet forwarding methods (Layer 3). The remaining layers, i.e., the upper layers, represent connection and recovery methods, security and authentication methods, representation formations and data interpretation which may include encryption or decryption information.

Network connectivity is enabled not only by the physical connectivity between the devices (layer 1), but also by the routing protocols running on them. Typically routing is an OSI Layer 3 function. Hence, it is not enough to have physical or link (Layer 1 or Layer 2) connectivity between the devices to ensure that devices can properly exchange information. Data packets will only flow via paths defined by the routing protocol, even if the physical connectivity supplies the necessary physical paths. In addition, routing protocol failures may prevent connectivity between nodes, even if the nodes are physically connected.

Network protocol management present significant management challenges as they include a large number of configurable distributed entities that are needed to accomplish consistent operations. Small typographical errors in a single router configuration can have wide-ranging effects. Conventionally, administrators must educate themselves on the proper configuration and operations of installed protocols and their use in networked systems. Backed with knowledge of the installed protocols, administrators, typically, must manually adapt or customize the network configurations and monitor operations to assure proper functionality and correct operation. When hardware and/or software elements (e.g., devices, cards, drivers, applications, new protocol entities, etc.) are added to, removed from, or reconfigured in the network, the changed network condition requires the adjustment of the associated protocol entities. The challenge to configure and manage the network is exacerbated when the network size grows to hundreds and even thousands of elements or devices. Continued adjustment of the protocol entities requires significant skill, effort and time on the part of the network administrator. Even with diligent effort on the part of a skilled network administrator, an error introduced during the network setup or subsequent reconfiguration or adjustment may render inoperative portions of, or even the entire, network for unacceptable lengths of time.

In addition, when errors in the network occur, the error may be caused by an error in the protocol configuration (i.e., a misconfiguration) or by failures in the underlying hardware or software. In the former case, the alarms, associated with the error, are generated in the network layer, whereas in the latter case, the alarms, associated with the error, are generated in a lower layer and propagated through the network layer. For example, protocol failures may impact Service Level Agreements when protocol entities fail to communicate or devices fail to communicate with each other through the proper exchange of routing information or establish new and/or alternate paths. However, a physical connectivity failure may also indicate one or more protocol failures. In this case, a failure of a node that is responsible for the exchange of routing information between two networks will generate failure alarms for the failed physical node and a failure in the associated protocol.

To determine misconfigurations or to distinguish misconfigurations from physical or other logical failures, management solutions must have the ability to analyze configurations all entities participating in the protocol, with an understanding of the different roles these entities (physical and logical) play in the protocol itself. As protocol events or alarms may be due to events (causing events) that happened in other components or other realms or domains of a system there is a need to correlate events in the other realms with events in the routing protocol realm. Hence, it is important that a comprehensive analysis of protocol configuration and operation be performed as routing protocol failures cannot be analyzed in isolation and the determination of the reason for the failure must be correlated with Layer 1 and Layer 2 failures in order to reach the root problem underlying the observed or detected alarms (symptoms).

Hence, there is a need in the industry for a method and apparatus that can automate the management of the configuration and operation of the network layer and further determine the root-cause of alarms generated at different levels of the network.

SUMMARY OF THE INVENTION

A method and apparatus for operating on a system containing a plurality of components communicating using at least one communication protocol is disclosed. The method comprises the steps of representing selected ones of the plurality of components, the relationship among the components and the associated communication protocols, determining a mapping between a plurality of events and a plurality of observable events occurring among the components and among the communication protocols, wherein the mapping is represented as a value associating each event with each observable event and performing the operation in conjunction with the events and observable events, wherein events associated with the communication protocols are distinguished from events associated with the components.

BRIEF DESCRIPTION OF THE DRAWINGS

FIG. 4C presents a tabulation of the relationships between model objects shown in FIG. 3;

FIGS. 5A-5E collectively illustrate exemplary diagnostic analysis tables associated with EIGRP protocols in accordance with the principles of the invention;

FIGS. 6A-6I collectively illustrate exemplary diagnostic analysis tables associated with ISIS protocols in accordance with the principles of the invention;

Figure 1:
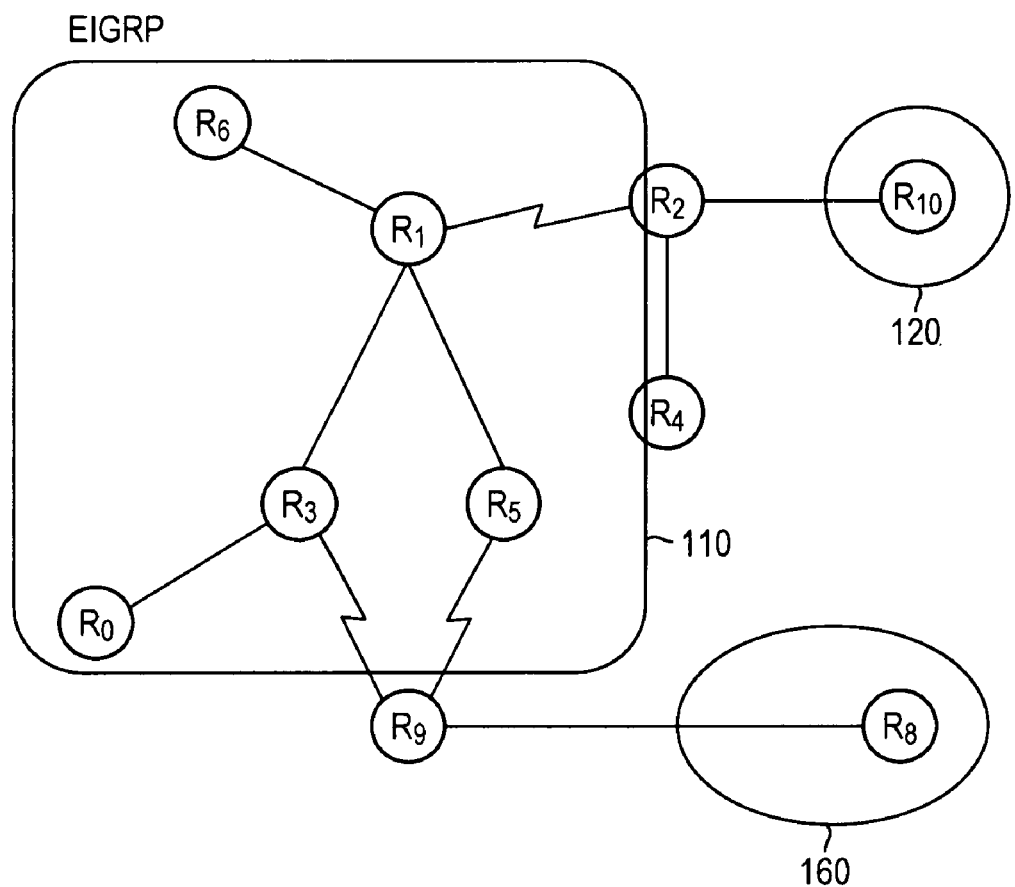
FIG. 1 illustrates a conventional network configuration employing EIRGP protocol links.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Networks are typically segmented into convenient physical or logic Autonomous System (AS), which independently administer components of the networked system. Such segmentation is necessary in part to spread the burden of the management system to a plurality of manageable systems.

Segmentation of the network requires that the routing protocols differ on whether the routing information is exchanged within or between Autonomous Systems (AS). There are essentially two types of routing protocols used: Interior Gateway Protocol (IGP) and Exterior Gateway Protocol (EGP). IGPs are used to exchange information within an AS. Examples of internal gateway protocols are Open Shortest Path First (OSPF) Intermediate System-to-Intermediate System (IS-IS) protocols and Enhanced Interior Gateway Routing Protocol (EIGRP). OSPF, IS-IS and EIGRP are a well-known protocols used in transferring packets within a network. EIGRP was developed by, and is proprietary to Cisco Corporation.

FIG. 1 illustrates a network configuration composed of Autonomous Systems 100, 110 and 120. AS 100 and AS 120 are composed a single router, R8, R10, respectively, and AS 110 is composed of a plurality of routers R0-R6. Each of the routers uses an EIGRP protocol session to transfer data among themselves and the Autonomous Systems. EIGRP provides enhanced internal routing as each router operates in the same manner and no special operations or functions are required from router R2 in transferring packets to router R10, even though these routers are in different Autonomous Systems.

Figure 2:
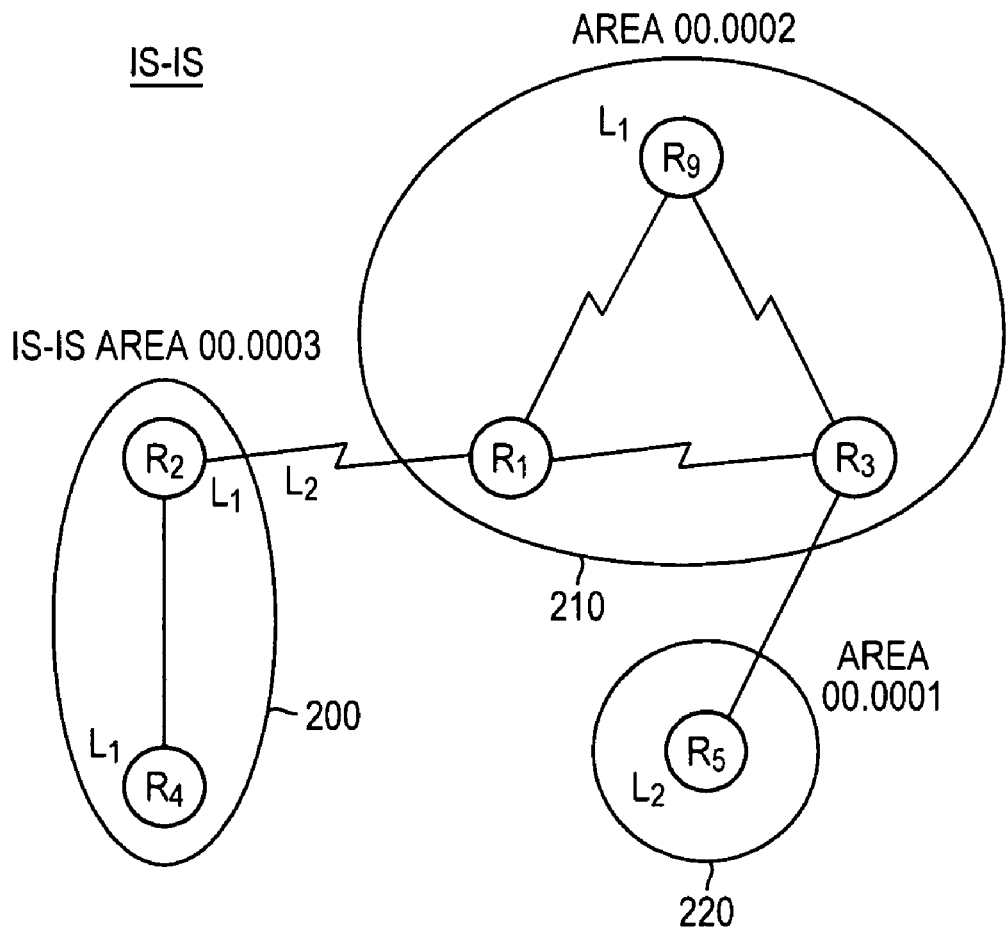
FIG. 2 illustrates a conventional network configuration employing ISIS protocol links.

FIG. 2 illustrates an exemplary network configuration composed of three Areas 200, 210, 220 using ISIS (Intermediate System-Intermediate System) protocols. In this illustrative example, Area 200 is includes routers R2 and R4, Area 210 includes routers R1, R3, and R9 and Area 220 includes router R5. Routers, R1, R2 and R3 represent routers that route packets between different areas as well as within the same area. These routers are referred as L1/L2 routers. On the other hand, routers R4 and R9 are referred to as L1 routers as these routers transmit packets in the same area and router R5 is referred to as an L2 router as it transmits only to different areas. Hence, the ISIS protocol requires that the routers be designated dependent upon the type of connections it possesses.

In order to enable the construction of ISIS and/or EIGRP network maps each router provides information to all neighboring interfaces. The information includes its interfaces, the connected networks, and any other information that it obtains from its neighbors. An ISIS and/or EIGRP router discovers its neighbors either by using the well-known ISIS and/or EIGRP Hello protocol or by manual configuration of the networks. A router enters into a neighbor relationship with each discovered or configured neighbor and each neighbor passes routing information to other neighbors so that all routers can form similar network maps.

An exemplary framework for modeling common objects, relationships, behaviors, and interactions associated with protocol entities is now discussed in accordance with the principles of the invention. Although the invention describes and illustrates a specific model, the principles of the invention are applicable to any modeling approach and are not limited by the model proposed or by the specific proposed modeling approach. In the models are that presented, the names assigned to the classes reflect ISIS and EIGRP entities being represented and are used for illustrative purposes only.

Figure 3:
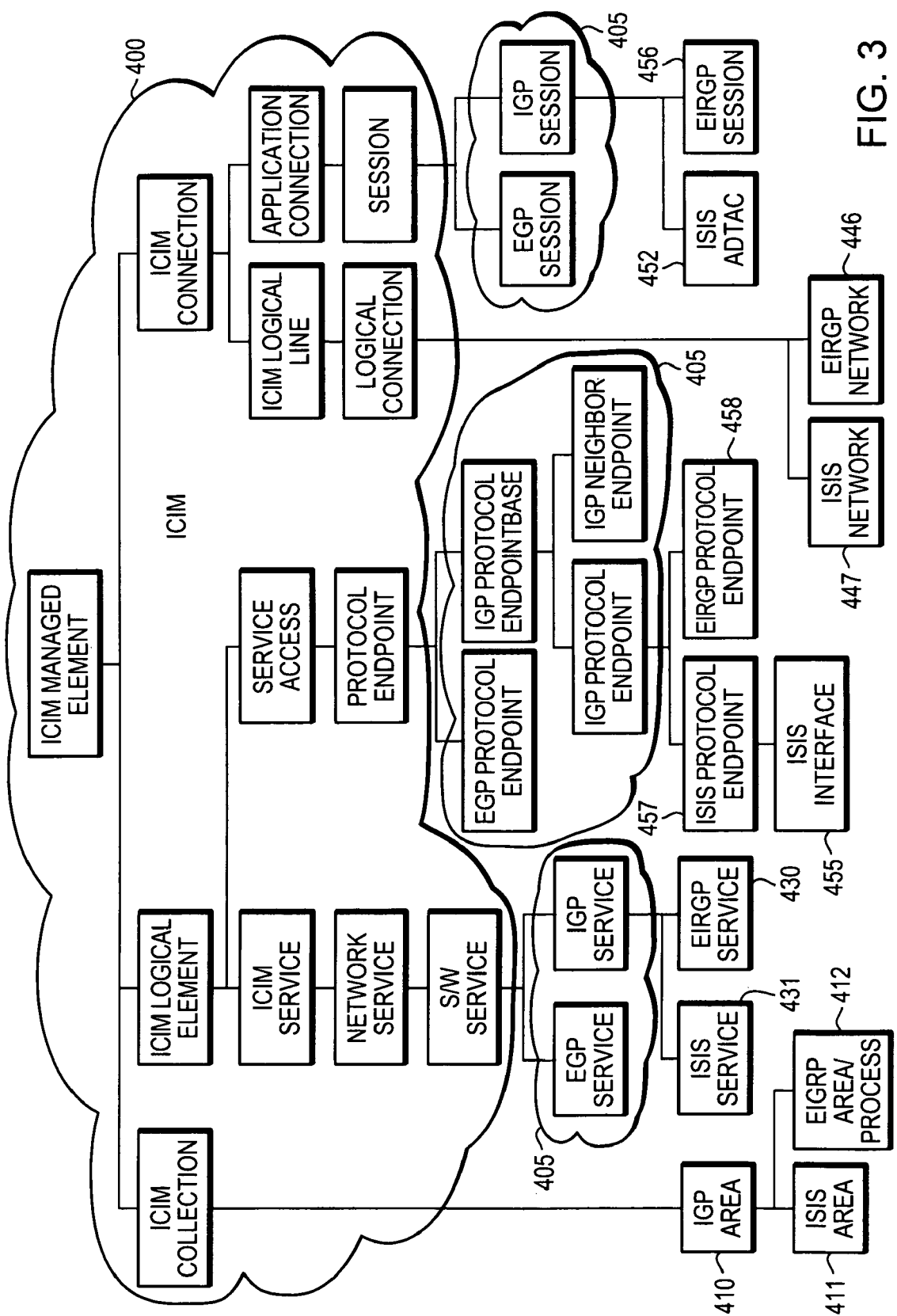
FIG. 3 illustrates a model-based class hierarchy of ISIS and EGIRP-based protocols in accordance with the principles of the invention.

FIG. 3 illustrate an exemplary embodiment of an computer model in accordance with the principles of the present invention for ISIS and EIGRP protocols. The model, shown in FIG. 3, is an extension of known network models, such as the SMARTS® InCharge™ Common Information Model (ICIM) 400, or a similarly defined or pre-existing CIM-based model. EMC, SMARTS and Incharge are trademarks of EMC Corporation, Inc., having a principle place of business in Hopkinton, Ma, USA. The ICIM model is itself an extension of the well-known DMTF/SMI model representing attributes and behaviors of the objects illustrated not found in the DMTF/SIM model. Model based system representation is discussed in the commonly-owned, referred to related US Patents and Patent Applications, the contents of which are incorporated by reference herein.

In the exemplary embodiment of ISIS and EIGRP protocols shown herein, the base model selected 400 is extended to accommodate the inclusion of the ISIS and EIGRP protocols by incorporating objects that describe the processing associated with the different protocols. These objects are grouped or encapsulated in entities 405 that represent objects associated with EGP and IGP protocols. The objects and relationships described herein are independent of the specific network configuration (i.e., configuration non-specific) and present parameters, characteristics and/or attributes of the components or operations comprising the network.

FIG. 3 illustrates an exemplary model-based class hierarchy for entities or devices associated with ISIS and EIGRP protocols. For example, IGPArea object 410 contains ISISArea 411 and EIGRPArea objects, which are representations of an IGP area. More specifically, each IGP area has its own view of each of the protocols that participates in the networked area. ISIS area 411 and EIGRP Area 412 represent a set of IP subnets within an autonomous system (AS). Attributes of Area 410 are at least an area identification, an IP Address and an Area type.

An ISIS and/or EIGRP area configuration object 420 represents an ISIS and/or EIGRP area as configured from the viewpoint of one of the routing devices running an ISIS and/or EIGRP service. Each routing device has its own view of an area's attributes. A Service object represents an ISIS 431 and/or EIGRP 430 protocol process running on a routing device. The ISISService object 431 and the EIRGPService object 430 manage the protocol exchanges with other ISIS and EIRGP services, respectively. An EIRGPNetwork object 446 or an ISISNetwork object 447 represents a collection of routing devices running either EIRGP or ISIS services on an IP network. An ISISAdjacency object 452 and EIRGPSession object 456 represents a logical element that retains the status of an ISIS adjacency or an EIRGP session.

Figure 4A:
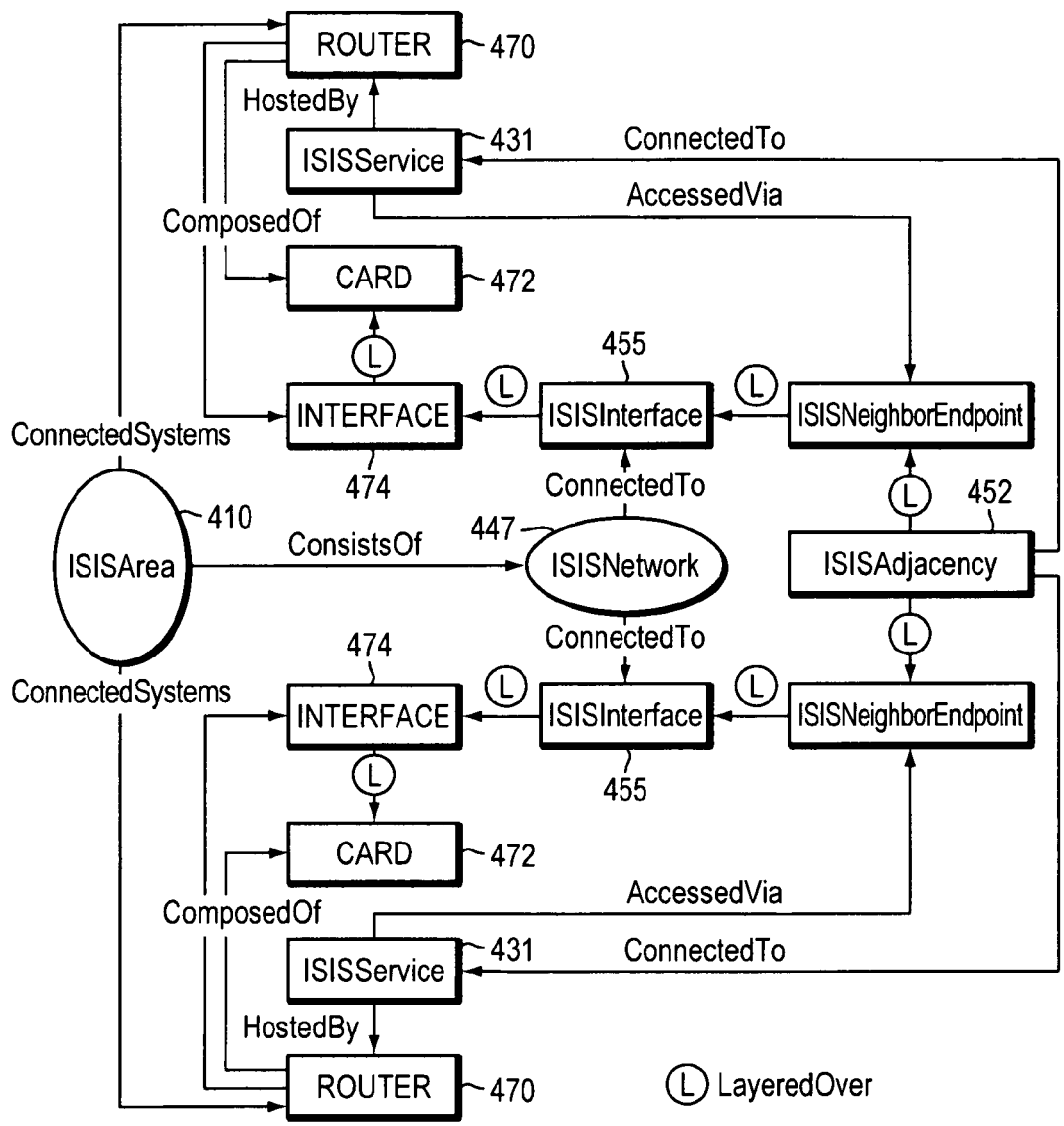
FIGS. 4A and 4B illustrate representations of ISIS model- and EIGRP model-based hierarchies in relation to associated physical element.

FIG. 4A illustrates the relationships between the ISIS model objects shown in FIG. 3. For example, the object ISISNetwork 447 possesses a "connected to" relationship with ISISInterface object 455. Although not shown, reciprocal relationships between the objects also exist. Similarly, the ISISService object 431, which resides on one or more physical entities (routers 470), possesses a hosted-by relationship with the routers 470. Further illustrated are the relationship of the router 470 to the cards 472 contained within the router and the relationship of the interfaces 474 that reside on the cards 472. These relationships are known from the ICIM model and need not be discussed in further detail herein. Also, illustrated is the relationship, i.e., layered-over, object ISISInterface 455 possesses with the hardware interface 474.

Figure 4B:
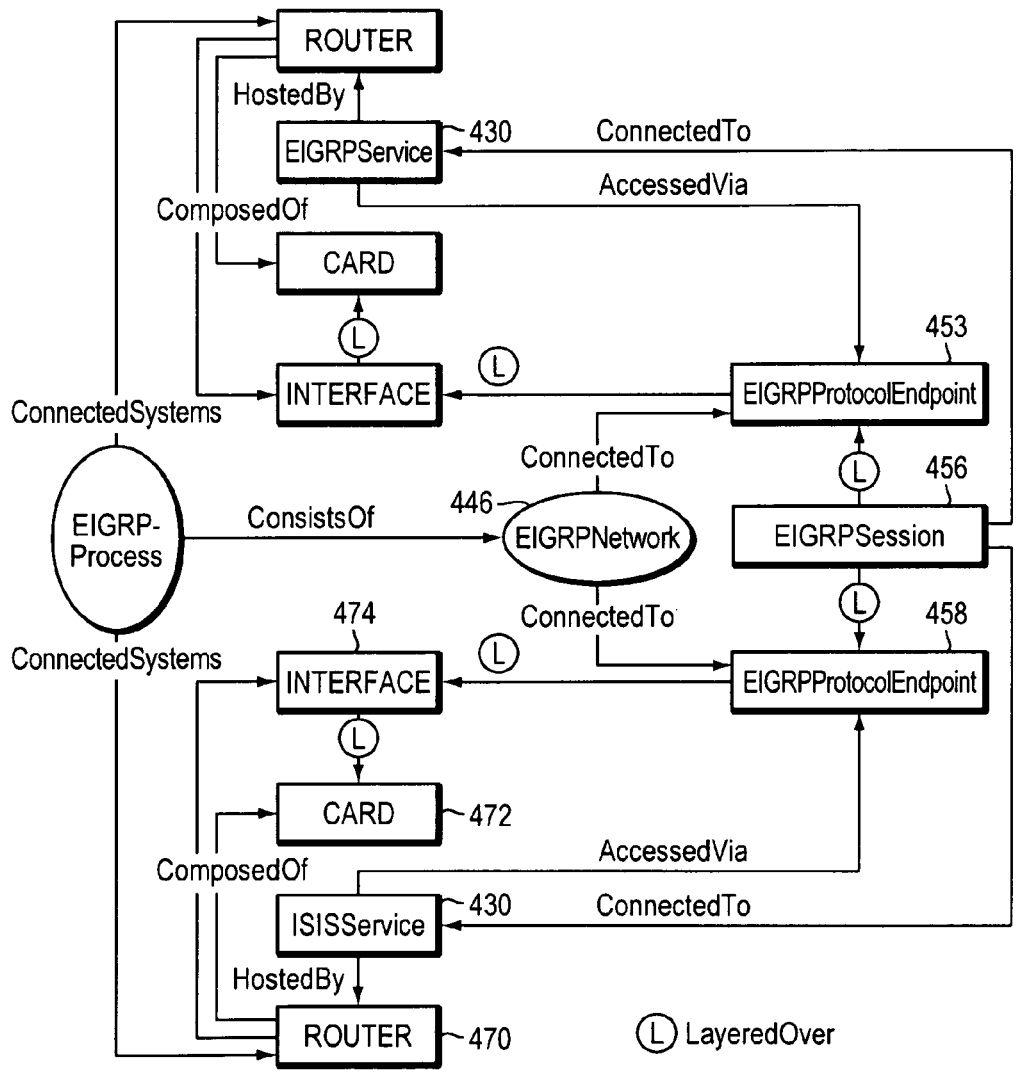

FIG. 4B illustrates the relationships between the EIGRP model objects shown in FIG. 3. For example, the object ISISNetwork 447 possesses a "connected to" relationship with ISISInterface object 455. Relationships similar to those shown in FIG. 4A exist with regard to the EIGRP objects describe and need not be discussed in detail further.

FIG. 4C tabulates the relationships between the model objects for each of the ISIS and EIRPG protocols. For example, EIGRPService is hosted by a router and the router possesses a reciprocal relationship, HostsServices, with the object EIGRPService. A similar pair of relationships exists for the ISISService and the router.

In one aspect of the invention, several forms of instrumentation may be used to acquire information about the networked system being modeled. For example, the objects of the protocol model may rely on one or more of the following sources of information to acquire information to populate object, relationship, behavior, and interaction instances of the modeled objects: SNMP MIBs (Management Information DataBase), for network devices, ISIS and/or EIGRP MIBs to obtain information about ISIS/EIGRP specific entities, BGP MIBs to obtain information about BGP specific entities, Command Line Interface (CLI) at the network devices, e.g., Show commands, and protocols that are associated with specific elements.

Each device which has been discovered in a network topology may be further probed to determine which protocols are supported. For each supported protocol, a deeper discovery may then be performed. For example, if a device is determined to support ISIS and/or EIGRP, the ISIS and/or EIGRP MIB may be probed to determine (1) ISIS and/or EIGRP interfaces on the devices; (2) to which ISIS and/or EIGRP networks the device connects; (3) to which ISIS and/or EIGRP area the devices participates in, etc.

In one aspect of the invention, periodic polling and asynchronous event processing may be used to monitor the state of ISIS and/or EIGRP neighbor relationships by polling the ISIS and/or EIGRP MIBs. Synchronous SNMP traps or syslog messages may also be parsed so that the information may be used to update the model. In this aspect of the invention information regarding devices that are experiencing connectivity failures may be collected. Remote unicast point, muticast ping, and remote traceroute information may also be used to collect desired information.

In one aspect of the invention, the information collected may be used to perform system analysis or operations on the model. For example, root cause analysis of problems that may occur may be performed based on the modeled system. In a preferred method of performing a root cause analysis similar to that disclosed in the above referred to commonly-owned related US Patents and Patent Applications, may be used. However, other methods or strategies (e.g., rule based) could be employed as well.

FIGS. 5A-5E collectively illustrate exemplary diagnostic analysis tables associated with EIGRP protocols in accordance with the principles of the invention. FIG. 5A presents the symptoms that are detected or observed by the EIGRPSession object when an EIGRP session is not established. FIG. 5B presents the problem that generated the symptom detected or observed by the EIGRPSession object in FIG. 5A. FIG. 5C presents the problem caused by the EIGRP session not being established. FIGS. 5D and 5E illustrate the symptoms detected by the EIGRPProtocolEndpoint object and the associated problems, respectively.

FIGS. 6A-6I collectively illustrate exemplary diagnostic analysis tables associated with ISIS protocols in accordance with the principles of the invention. FIG. 6A illustrates the symptom detected or observed when an ISIS interface fails. FIG. 6B illustrates the symptom when a link is reporting an improper neighbor state.

Figure 7A:
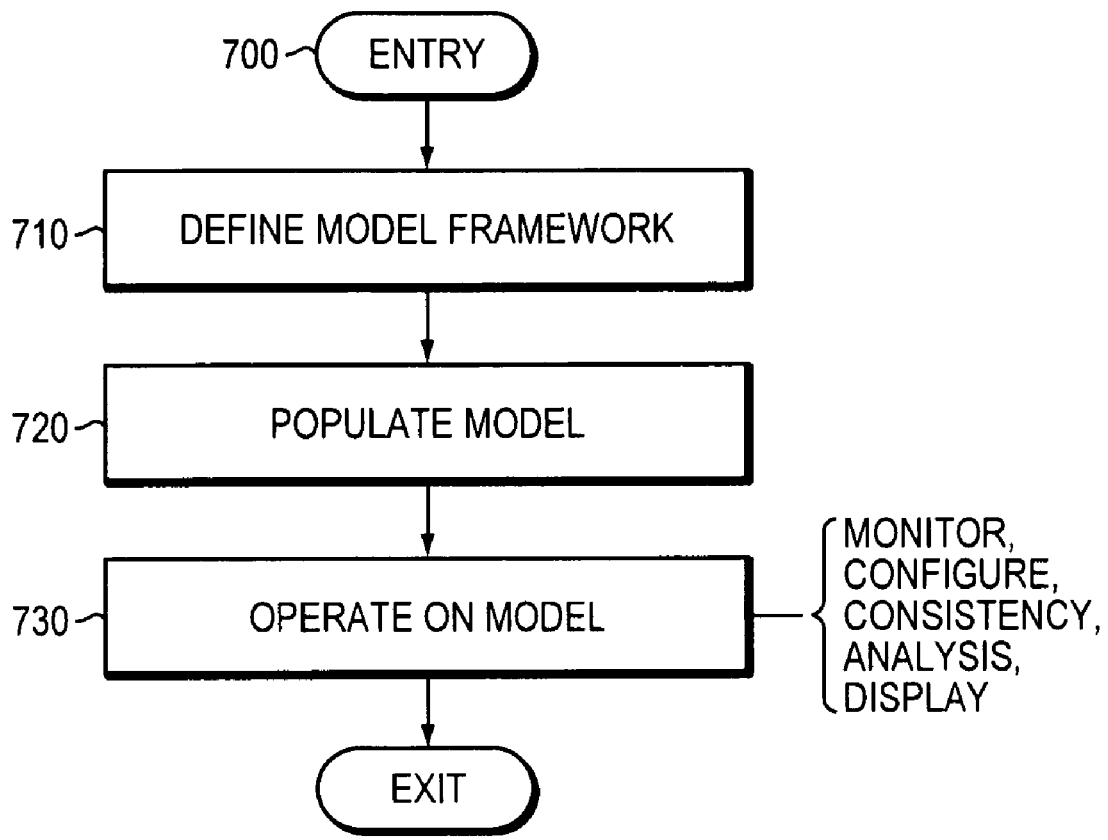
FIG. 7A illustrates a flow chart of an exemplary process in accordance with the principles of the invention.

FIG. 7A illustrates a flowchart of an exemplary process 700 of Model-Based Protocol Management (MB-PM) in accordance with the principles of the present invention. In this exemplary process, at block 710, a model framework for the modeling protocol entities, relationships, behaviors and interactions is defined. The model is an abstraction of the underlying hardware and software components. Although the present invention has been described with regard to an ICIM model, any specific modeling technique can be applied at this stage. At block 720, the model is populated with protocol entity, relationship, behavior and interaction instances for the managed environment (i.e., modeled system or network). In this case, well-known algorithms, databases and techniques may be applied to retrieve information from the configuration of the instances of the modeled protocol entities to populate the model with the device details discovered, as described previously. Discovery of information may further include the discovery of the types of networks. Those skilled in the art would recognize the discovery may be done automatically or manually.

At block 730, operation on the environment through the instantiated model may be performed. For example, operations may comprise monitoring the underlying protocol entities to verify that the global model is synchronized with the state of the underlying protocol entities, configuring or provisioning the protocol entities, configuring or checking the consistency of the protocol entity configurations, analyzing the state of the protocol entity model to detect configuration errors, global failure modes and health status of the protocol entities, and displaying/visualizing the components, objects and their relationships.

In another aspect of the invention, discovery of the state of introduced or removed components, elements or objects and their relationships, and populating the model after dynamic changes in the protocol entities of the system may be performed. This aspect of the invention may include re-populating protocol entity and relationship instances of the managed environment by using, for example, a series of discovery algorithms and techniques to retrieve information regarding newly introduced, changed, or removed components, objects, or resources instances in the networked system.

Using the MB-PM model in accordance with the principles of the invention, the system can use, preferably the correlation method described in the aforementioned related US Patents and Patent Applications, to correlate the alarms or generated error messages from the devices in the same area and diagnose the failure in a specific router as the root cause. However, other methods or strategies (e.g., rule based) could be employed as well.

For example, to determine one operation, such as root cause of a failure, involving routing protocol the following steps may be executed:

For each failed routing protocol session (ISIS and/or EIGRP)

a. Using a model of the target system and a correlation technique, correlate the failure with other related failures;

b. Define a problem called "Down" on each protocol entity such as ProtocolService, Interface, and NeighborEndpoint. The symptom of each "Down" failure consists of the set of protocol sessions related to the "Down" device. For example, the symptoms of ProtocolService Down consists of all protocol sessions originating or terminating in that service failing;

c. Determine a failing entity that best describes or explains the set of failed routing protocol sessions;

d. Determine whether the failed protocol entity is misconfigured;

e. If the root cause of the failure is not a misconfiguration, determine whether the failure results from a connectivity failure in the Layers 1-3;

f. If no root cause has been determined by the prior steps, perform a remote unicast or multicast Layer 3 ping to determine if there is an undetected Layer 3 problem;

g. If there is an undetected Layer 3 problem and the failed sessions is between non-adjacent protocol entities (such as ISIS or EIGRP peers), perform a remote traceroute to localize the problem to a particular device along the path between protocol entities;

f. If no other cause of the routing session can be determined, then report the routing session failure itself as the root cause.

In another aspect of the invention, it is possible to determine whether an operation such as global connectivity correctness is achieved. In this aspect of the invention, a search of the routing topology is performed as follows;

a. Using the model of the routing infrastructure, determine if each ISIS and/or EIGRP Area is disconnected. Each of these states can be determined in linear time by treating the routing protocol entities as nodes and links between entities as edges in an undirected graph. Then well-known forms depth first search can be used to determine if the graph is disconnected, singly connected or bi-connected. (E.g. see Aho, Hoperoft, and Ullman "The design and analysis of computer algorithms pg. 179-187);

b. Compare the checksum on the link-state database of each protocol entity within each ISIS and/or EIGRP area. If the checksums don't match between two entities in the same area, then ensure that the lagging link-state databases converge to the checksum after some time-out period t or else report a convergence failure;

c. Compare area-wide ISIS and/or EIGRP configuration parameters to ensure compatibility. For each ISIS and/or EIGRP area, consider how the area is configured in each router and make sure that all configurations are compatible.

Figure 7B:
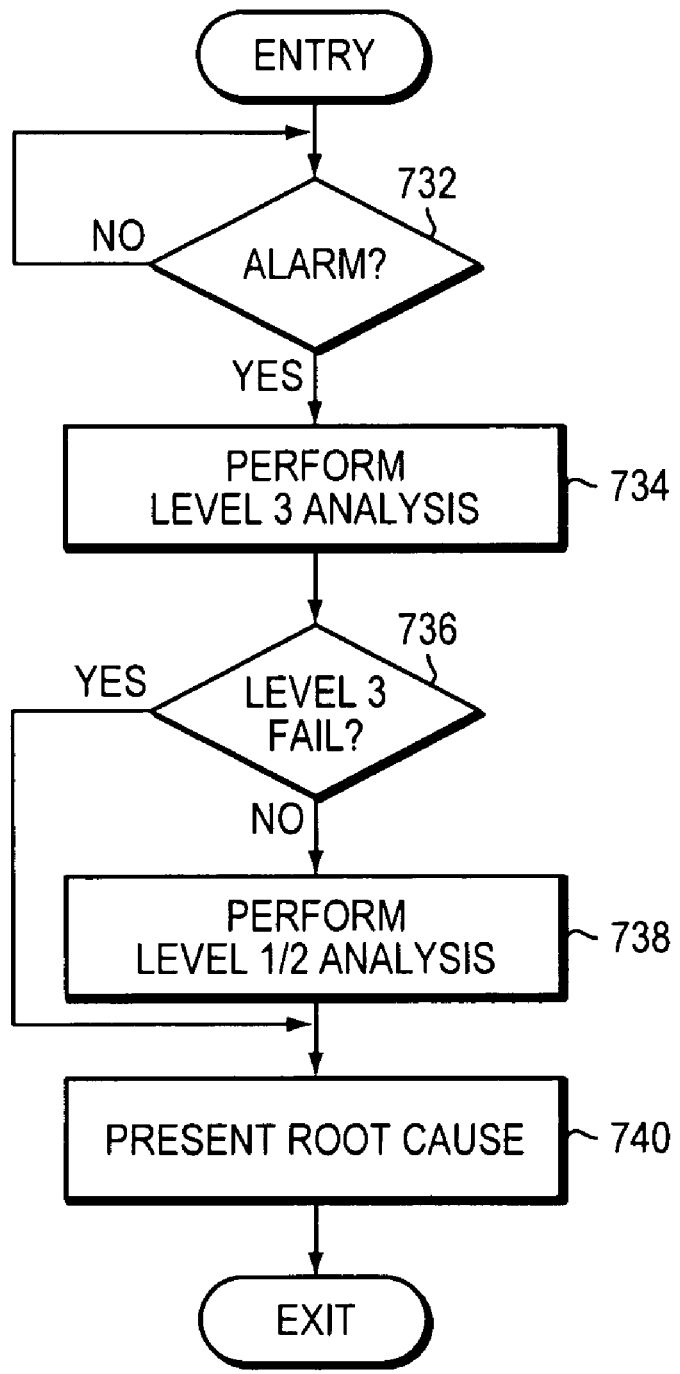
FIG. 7B illustrates a flow chart of a second exemplary process in accordance with the principles of the invention.

FIG. 7B illustrates a flowchart of an exemplary process for operating on the model, block 730 of FIG. 7A, in accordance with the principles of the invention. In this exemplary process, a determination is made at block 732 whether an alarm is detected. If the answer is in the affirmative, a level 3 analysis is performed at block 734. The analysis, for example, may be a root cause analysis using information associated with protocol errors as shown in FIG. 5A-5E or 6A-6I. At block 736, a determination is made whether the alarm is associated only with a level 3 failure. If the answer is negative, then an OSI stack Layer 1/Layer 2 analysis is performed at block 738. At block 740, the results of the analysis are presented on a display, for example. The presentation may indicate an OSI Layer 3 or a OSI Layer 1/2 cause of the generated alarm. Although the process shown herein depicts separate analysis for OSI Layer 3 and OSI Layer 1/2 alarms, it would be recognized that the analysis may be performed in a single operation.

As would be appreciated by those skilled in the art, the processes describe herein may be performed upon detection of a failure or may be run periodically or whenever a change in the topology occurs.

Although the present invention has been described with regard to network routing protocols and their management challenges focusing on the Internet Protocol (IP) Border Gateway Internal Gateway Protocol (IGP) protocols, it would be recognized that the principles of the invention described herein are generic and can be applied to other types of routing protocol. The features and steps enumerated above are provided for purposes of example and illustration only and not for purposes of limitation. Additional features of the embodiments of the present invention will become apparent through the following detailed explanation and the drawings incorporated herein.

For example, the method described herein is suitable for messaging protocols that enable communication among application components in a distributed system. Such protocols are used in the TIBCO messaging, SAP messaging, J2EE messaging (JMS—Java Message Service), Websphere messaging, etc. Similarly, the method described herein is suitable for application protocols operating among application components that include, for example, HTTP, exchanges between web servers and databases, ERP applications, e.g., SAP exchanges, e-mail exchange protocols, etc. Control protocols such as optical network control planes and protocols to allocate resources for Service Level Agreements (SLAs) may also be represented, as well as IPSec (IP Security) and ATM, in accordance with the principles of the invention.

Figure 8:
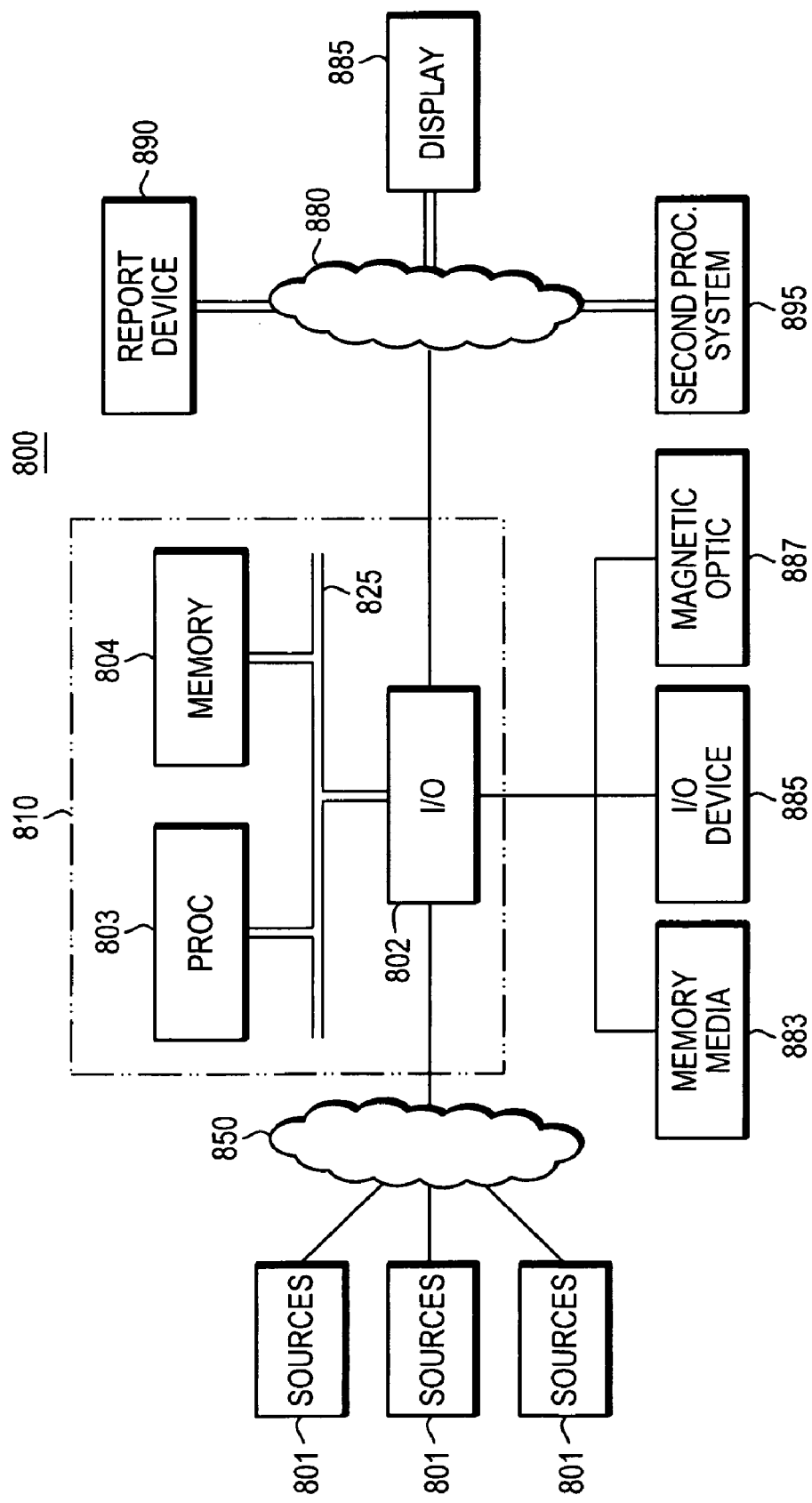
FIG. 8 illustrates an exemplary system for practicing the process discloses herein.

Sample descriptions of protocol presented are provided by way of explanation only. The presented examples are merely for illustrating the principles of the invention and the invention should not be considered to be limited to the examples presented FIG. 8 illustrates an exemplary embodiment of a system 800 that may be used for implementing the principles of the present invention. System 800 may contain one or more input/output devices 802, processors 803 and memories 804. I/O devices 802 may access or receive information from one or more sources or devices 801. Sources or devices 801 may be devices such as routers, servers, computers, notebook computer, PDAs, cells phones or other devices suitable for transmitting and receiving information responsive to the processes shown herein. Devices 801 may have access over one or more network connections 850 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 802, processors 803 and memories 804 may communicate over a communication medium 825. Communication medium 825 may represent, for example, a bus, a communication network, one or more internal connections of a circuit, circuit card or other apparatus, as well as portions and combinations of these and other communication media. Input data from the client devices 801 is processed in accordance with one or more programs that may be stored in memories 804 and executed by processors 803. Memories 804 may be any magnetic, optical or semiconductor medium that is loadable and retains information either permanently, e.g. PROM, or non-permanently, e.g., RAM. Processors 803 may be any means, such as general purpose or special purpose computing system, such as a laptop computer, desktop computer, a server, handheld computer, or may be a hardware configuration, such as dedicated logic circuit, or integrated circuit. Processors 803 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on or provided by a computer readable medium. The code may also be stored in the memory 804, for example, or may be read or downloaded from memory medium 883, or an I/O device 885 or magnetic or optical media, such as a floppy disk, a CD-ROM or a DVD, 887 and then stored in memory 804. The code may, in one aspect of the invention, be downloaded over one or more of the illustrated networks or provided through I/O device 885. As would be appreciated, the code may be processor-dependent or processor-independent. JAVA is an example of processor-independent code. JAVA is a trademark of the Sun Microsystems, Inc., Santa Clara, Calif. USA.

Information from device 801 received by I/O device 802, after processing in accordance with one or more software programs operable to perform the functions illustrated herein, may also be transmitted over network 880 to one or more output devices represented as display 885, reporting device 890 or second processing system 895.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may further be used to perform system analysis that may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer implemented method for operating on a system containing a plurality of components communicating using at least one communication protocol, the method comprising the steps of:
representing selected ones of the plurality of components, in one or more computers, the relationship among the components and the associated communication protocols; wherein the protocols are selected from the group consisting of: ISIS and EIGRP; wherein the step of representing the at least one communication protocol is based on the selection of the protocol and comprises selecting a representation creation process from the group consisting of a first creation process and a second creation process, wherein the first creation process comprises creating at least one non-specific representation of communication protocols selected from the group consisting of ISIS Area, ISISService, ISISProtocolEndPoint; ISISInterface; ISISNetwork, and ISISAdjacaceny; and wherein the second creation process comprises creating at least one non-specific representation of communication protocols selected from the group consisting of: ISISArea, ISISService, ISISProtocolEndPoint; ISISInterface; ISISNetwork, and ISISAdjacaceny; and creating at least one non-specification representation of relations along which the events propagate amongst the communication protocols, wherein the representations of relations are selected from the group consisting of: ConnectedSystem, ConsistsOf, MemberOf, ConnectedTo, ConnectedVia, Accesses, AccessedVia, HostedBy, HostsServices, ComposedOf, part of, Underlying and LayeredOver;

determining a mapping between a plurality of events and a plurality of observable events occurring among the components and among the communication protocols, wherein the mapping is represented as a value associating each event with each observable event, and performing the operation in conjunction with the events and observable events, wherein the events associated with the communication protocols are distinguished from events associated with the components.

2. The method as recited in claim 1, where the step of determining a mapping comprises the steps of:

creating a first mapping among a plurality of events and a plurality of observable events occurring among the communication protocols; and creating a second mapping among a plurality of events and a plurality of observable events occurring among the components.

3. The method as recited in claim 1, wherein the operation is selected from the group consisting of: monitoring, discovering, managing, analyzing and displaying.

4. The method as recited in claim 3, wherein the analyzing operation is selected from the group consisting of: root-cause, impact, connectivity and performance.

5. An apparatus for operating on a system containing a plurality of components communicating using at least one communication protocol, the apparatus comprising:

a processor in communication with a memory, the processor executing code for:

representing selected ones of the plurality of components, the relationship among the components and the associated communication protocols; wherein the protocols are selected from the group consisting of: ISIS and EIGRP; wherein the step of representing the at least one communication protocol is based on the selection of the protocol and comprises selecting a representation creation process from the group consisting of a first creation process and a second creation process, wherein the first creation process comprises creating at least one non-specific representation of communication protocols selected from the group consisting of ISISArea, ISISService, ISISProtocolEndPoint; ISISInterface; ISISNetwork, and ISISAdjacaceny; and wherein the second creation process comprises creating at least one non-specific representation of communication protocols selected from the group consisting of: ISISArea, ISISService, ISISProtocolEndPoint; ISISInterface; ISISNetwork, and ISISAdjacaceny; and creating at least one non-specification representation of relations along which the events propagate amongst the communication protocols, wherein the representations of relations are selected from the group consisting of: ConnectedSystem, ConsistsOf, MemberOf, ConnectedTo, ConnectedVia, Accesses, AccessedVia, HostedBy, HostsServices, ComposedOf, part of, Underlying and LayeredOver;

determining a mapping between a plurality of events and a plurality of observable events occurring among the components and among the communication protocols, wherein the mapping is represented as a value associating each event with each observable event, and performing the operation in conjunction with the events and observable events, wherein events associated with the communication protocols are distinguished from events associated with the components.

6. The apparatus as recited in claim 5, wherein the processor executing code for determining a mapping comprising the steps of:

creating a first mapping of between a plurality of events and a plurality of observable events occurring among the communication protocols; and creating a second mapping of between a plurality of events and a plurality of observable events occurring among the components.

7. The apparatus as recited in claim 5, wherein the operation is selected from the group consisting of: monitoring, discovering, managing, analyzing and displaying.

8. The apparatus as recited in claim 7, wherein the analyzing operation is selected from the group consisting of: root-cause, impact, connectivity and performance.

9. The apparatus as recited in claim 5, further comprising: an input/output device in communication with the processor.

10. A non-transitory computer-readable storage medium providing computer readable code for providing instruction to a processor for operating on a system containing a plurality of components communicating using at least one communication protocol, the code instructing the processor to execute the steps of:

representing selected ones of the plurality of components, the relationship among the components and the associated communication protocols; wherein the protocols are selected from the group consisting of: ISIS and EIGRP; wherein the step of representing the at least one communication protocol is based on the selection of the protocol, and comprises selecting a representation creation process from the group consisting of a first creation process and a second creation process, wherein the first creation process comprises creating at least one non-specific representation of communication protocols selected from the group consisting of ISISArea, ISISService, ISISProtocolEndPoint; ISISInterface; ISISNetwork, and ISISAdjacaceny; and wherein the second creation process comprises creating at least one non-specific representation of communication protocols selected from the group consisting of: ISISArea, ISISService, ISISProtocolEndPoint; ISISInterface; ISISNetwork, and ISISAdjacaceny; and creating at least one non-specification representation of relations along which the events propagate amongst the communication protocols, wherein the representations of relations are selected from the group consisting of: ConnectedSystem, ConsistsOf, MemberOf, ConnectedTo, ConnectedVia, Accesses, AccessedVia, HostedBy, HostsServices, ComposedOf, part of, Underlying and LayeredOver;

determining a mapping between a plurality of events and a plurality of observable events occurring among the components and among the communication protocols, wherein the mapping is represented as a value associating each event with each observable event, and performing the operation in conjunction with the events and observable events, wherein events associated with the communication protocols are distinguished from events associated with the components.

11. The non-transitory computer-readable medium as recited in claim 10, wherein the code providing instruction to the processor for executing the steps of:
creating a first mapping among a plurality of events and a plurality of observable events occurring among the communication protocols; and
creating a second mapping among a plurality of events and a plurality of observable events occurring among the components.

12. The non-transitory computer-readable medium as recited in claim 10, wherein the operation is selected from the group consisting of: monitoring, discovering, managing, analyzing and displaying.

13. The non-transitory computer-readable medium as recited in claim 12, wherein the analyzing operation is selected from the group consisting of: root-cause, impact, connectivity and performance.

* * * * *